Figure 1:
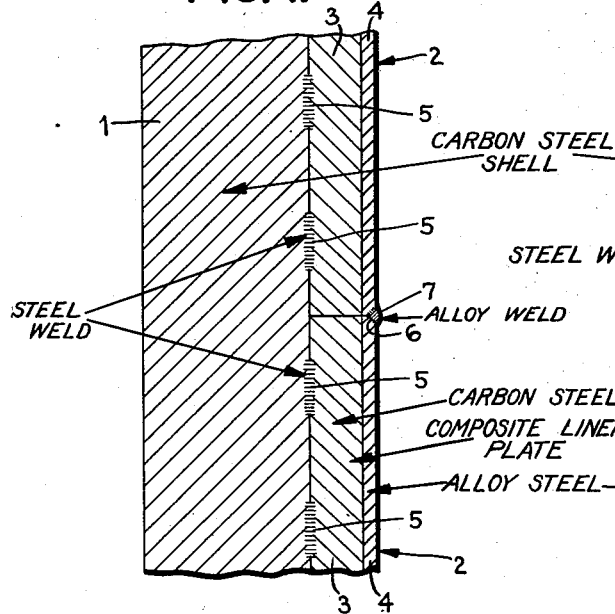

July 23, 1940.  G. W. WATTS  2,209,290

NONCORROSIVE VESSEL

Filed May 1, 1937

INVENTOR
GEORGE W. WATTS
BY
*Pike H. Sullivan*
ATTORNEY

Patented July 23, 1940

2,209,290

UNITED STATES PATENT OFFICE 2,209,290

NONCORROSIVE VESSEL

George W. Watts, Flossmoor, Ill., assignor to Standard Oil Company, Chicago, Ill., a corporation of Indiana Application May 1, 1937, Serial No. 140,191

2 Claims. (Cl. 220—63)

My invention relates to pressure vessels provided with a noncorrosive lining and refers in particular to an improved lining of this character and an improved method and means for applying such lining to the interior of a vessel.

My invention is applicable to any vessel having a steel shell and adapted to contain corrosive fluids therein, but is particularly adapted for use with vessels employed in the treatment of hydrocarbon fluids under pressure and at relatively high temperature, such for example, as pressure stills, reaction chambers, fractionating towers and the like. It has been proposed in the past to provide such vessels with a noncorrosive alloy lining, and to secure the lining to the shell of the vessel by means of welding. The welds may be in the form of plugs extending through the lining and welded to the shell of the vessel and the lining, or the lining may be directly welded to the shell of the vessel at a plurality of points by such means as resistance welding. It has also been proposed to provide a chill plate between the shell of the vessel and the alloy lining at the seams between adjacent plates of the lining material, and to weld such seams together without any bond or attachment between the lining and the shell of the vessel. Each of these proposals except the last involves the welding of alloy material to carbon steel, and the last proposal is generally unsatisfactory from a mechanical standpoint in view of the lack of union between the lining and the shell of the vessel.

I have found that it is difficult to avoid brittle zones in the vicinity of welds wherein, as in the past, alloy material is directly welded to carbon steel. Such brittleness causes cracks and breaks in the welds during use of the vessel, and in some cases causes cracks and breaks in the main seams of the vessel when an alloy weld coincides with the steel welds at such main seams. Such cracks and breaks will permit leakage of liquid between the lining and the shell of the vessel, which, on increase in temperature or decrease of pressure, may cause the lining to "puff" or warp. Such "puffing" or warping may cause further cracking, either at the seams of the alloy lining or at the point where the "puffing" occurs, and may even cause the alloy sheet to tear loose from the wall of the vessel, thereby resulting in a substantially total mechanical failure of the lining.

It is an object of my invention to provide a pressure vessel having a noncorrosive lining which may be applied to the vessel in such manner as to overcome the difficulties hereinabove referred to and which is less expensive in original cost, installation and maintenance then linings heretofore used for this purpose. It is a further object of my invention to provide an improved method and means for constructing alloy-lined pressure vessels and for securing the alloy lining to the shell of the vessel and sealing the seams in such lining. It is also an object of my invention to provide a lining for pressure vessels, and a manner of applying the same to the shell of such vessels, in which steel is welded to steel and alloy material is welded to alloy material.

Other objects and advantages of my invention will become apparent from the following description and with reference to the attached drawing in which I have illustrated several typical embodiments of my invention and the manner of practicing the same.

In accordance with my invention the vessel has a steel shell which may be formed by a plurality of steel plates suitably shaped and joined at the edges or seams by welding or the like, and is provided on the interior of such shell with a lining of one or more composite integral duplex plates comprising a layer or sheet of ordinary steel and a layer or sheet of noncorrosive alloy steel bonded or fused together in billet and subsequently hot or cold rolled to the desired thickness. The alloy portion of such composite plates may, for example, consist of a chromium or chromium-nickel alloy such as 4–6% chromium, 12–15% chromium, 15–18% chromium, or 18% chromium and 8% nickel. Plates of this character are available on the market under various trade names such, for example, as "Plykrome" and "Ingaclad."

The steel side of the composite liner plate is placed next to the steel shell of the vessel, and is joined to the shell at a plurality of points over the surface thereof by steel welds. The welds may be formed by any desired means, but preferably the method of resistance welding well known in the art is employed. The welds may be in the form of a plurality of closely spaced spot welds, but are preferably in the form of a plurality of spaced line welds running in either one or two directions at frequent intervals over the surface of the liner plate and dividing any space between the shell of the vessel and the face of the liner into a plurality of separated cells. The edges of the steel portions of the composite liner plates may be welded to the shell of the vessel by steel welds, and adjacent edges of such steel portions at seams in the lining may also be welded together by steel welds. Such steel welds preferably do not contact any alloy material.

The seams between adjacent liner plates or between adjacent edges of a single liner plate are sealed on the alloy side of the composite lining with alloy material, preferably of the same composition as the material in the alloy portion of the composite liner plate. Such seals are provided by alloy welding the alloy material to alloy portions of a liner plate on each side of the seam. The alloy welds preferably do not contact any steel or steel welds.

The lining may be applied to a complete vessel, or the liner plates may be welded to the steel plates of the vessel shell before the same are fabricated into the vessel and seams in the lining, after such fabrication, sealed in the manner aforementioned.

Having disclosed the general nature of my invention, I will now specifically described the typical arrangements or embodiments of the same which are illustrated in the several views of the drawing and in which like reference characters are applied to like parts in the several views.

In all of the figures the reference character 1 refers to a fragmentary transverse section through a steel plate comprising a portion of the shell of a vessel. The character 2 refers to the composite integral duplex liner plate consisting of a steel sheet 3 intimately bonded to an alloy sheet 4. The steel portions 3 of the liner plates 2 are disposed next to the steel plate 1 of the shell, and are joined thereto at frequent intervals by resistance welding, as indicated at 5. The welds 5 may be in the form of a plurality of spot or line welds, as hereinabove described.

In Fig. 1 I have illustrated an embodiment of my invention wherein the liner plates are placed in a vessel with substantially no space between the adjacent edges of the plates at a seam in the lining. The alloy portion 4 of the liner plates is given a small chamfer 6 along the seam, and the seam is sealed along its entire length by welding alloy material 7 to the alloy portions of the liner plates within the groove formed by the chamfer. The groove formed by chamfer 6 is preferably contained in only the alloy portions 4 of the composite liner plates 2 to prevent the alloy weld 7 from contacting the steel portions 3 of the plates. In view of its simplicity and low installation cost this arrangement is advantageous in cases where the lining can be applied to a vessel in such manner as to leave substantially no space at the seams of the lining and wherein the lining is not subjected to too severe operating conditions.

Figure 2:
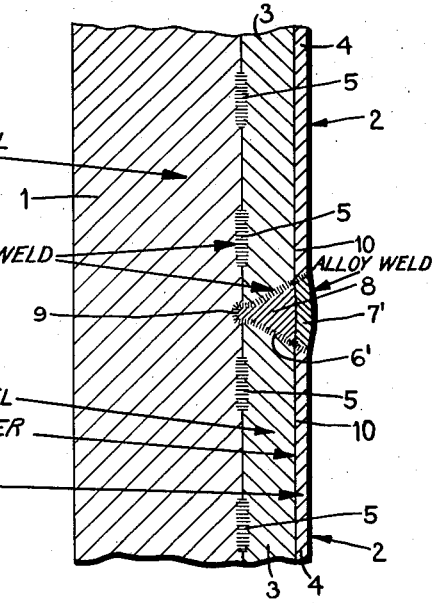

In Fig. 2 I have shown an embodiment in which a spacing is left between the adjacent edges of the liner plates at a seam in the lining. In this figure the chamfer 6' is extended through the steel portions 3 of the composite liner plates 2, and a steel weld 8 is provided along the seam between the adjacent chamfered edges of such steel portions 3. The liner plates are preferably so spaced as to permit this steel weld 8 to extend to the shell plate 1 of the vessel, as indicated at 9, and thereby weld the adjacent steel portions of the liner plates at the seam to the shell of the vessel as well as to each other. The weld 8 preferably extends outwardly into the chamfer 6' only as far as a plane denoted as 10 and marking the bond between the portions 3 and 4 of the plates 2. The adjacent edges of the alloy portions 4 of the liner plates are welded together by means of the alloy weld 7' which lies above the steel weld 8 and provides a seal of alloy material for the seam. This arrangement provides a seam for the lining that is mechanically stronger than that of Fig. 1 and which avoids the necessity of permitting substantially no space between the liner plates at a seam.

Figure 3:
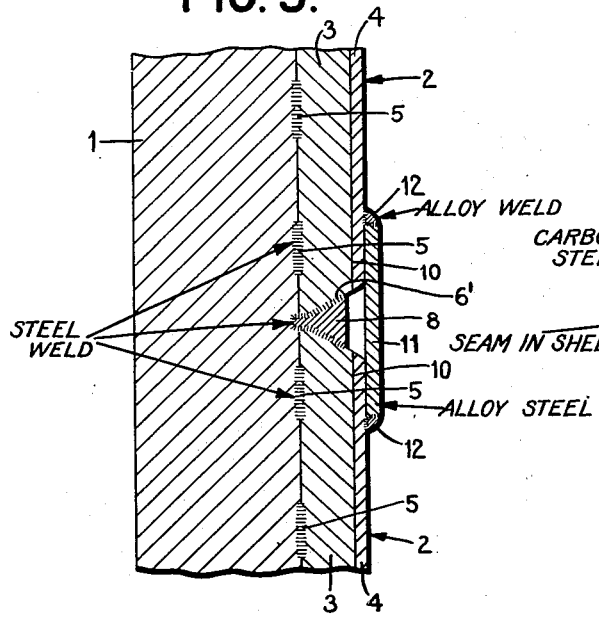

In Fig. 3 I have shown a manner of providing an alloy seal for the lining at a seam thereof which avoids any difficulty which might arise in the arrangement of Fig. 2 from permitting contact and fusion between a steel weld and an alloy weld. In this embodiment the alloy weld 7' of Fig. 2 has been replaced by a plate 11 of alloy material which extends along the entire length of the seam and overlaps the alloy portions 4 of the liner plates on each side of the seam. The plate 11 is welded to the alloy portions 4 of the liner plates by fillet welds 12 of alloy metal which extend along both sides of the plate for the entire length of the seam. The alloy plate 11 and alloy welds 12 constitute a seal for the seam in which alloy material is welded to only alloy material, and the liner plates are secured to the shell of the vessel by steel welds in which steel is welded to only steel.

Figure 4:
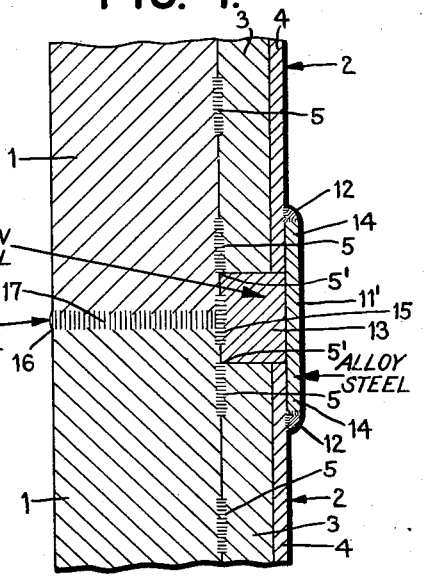

In Fig. 4 I have shown an embodiment of my invention in which the space between adjacent liner plates 2 at a seam in the lining is filled by a carbon steel filler strip 13 just wide enough to slip into the slot formed by the liner plates 2. An alloy plate 11' rests upon the filler strip 13 and overlaps the alloy portions 4 of the liner plates 2 on each side of the seam to which it is welded along its edges by the alloy welds 12 to provide an alloy seal for the seam in which alloy material is welded to only alloy material, as in the arrangement shown in Fig. 3. If desired, the steel filler strip 13 and alloy plate 11' may comprise a composite integral duplex plate of the type used for the main liner plates 2, and in which the steel portion of such plate is cut away on each side to provide overlapping portions 14 of alloy material only. The edges of the steel portions 3 of the liner plates 2 are preferably spot or line welded to the steel shell plate 1, as indicated at 5', to provide a strong bond between the shell of the vessel and the edges of the plate 2 to prevent any tendency of warping at such edges, particularly at seams in the lining. The steel portion 13 of the filler strip is preferably spot or line welded to the shell of the vessel, as indicated at 15. In this figure I have also shown a seam 16 in the shell of the vessel which is coincident with the seam of the lining. The adjacent plates 1 are welded together at the main seam, as indicated by 17.

In the various arrangements thus described the steel welds 8 and the alloy welds 7, 7' and 12 are preferably made by the electric arc process in which an electrode of suitable steel material is used for the steel welds and an electrode of alloy material for the alloy welds. For best results the material used for the alloy plates 11 and 11' and for the alloy welds is preferably of a composition similar to that of the alloy portions 4 of the main liner plates 2. It is also preferable that the materials used for the steel welds 8 and 17 have compositions similar to those of the steel portions 3 and steel plates 1, respectively. The steel shell plates 1 and the steel portion 3 of the lining are also preferably of the same composition.

While I have shown a seam in the main shell of the vessel which coincides with a seam in the lining in Fig. 4 only of the drawing, my invention contemplates using any of the liner seams illustrated in Figs. 1 through 4 with such arrangement.

As hereinabove indicated, my invention also contemplates the application of the liner to the steel plates constituting the shell of the vessel prior to the shaping and fabrication of such steel plates into the form of the vessel. In such case one or more liner plates 2 are placed on a steel plate 1 with the steel side of the liner adjacent the plate 1, and are welded thereto at a plurality of points by means of spot or line welds 5, as hereinabove described. If two or more liner plates are used the seams between these plates are sealed in any of the manners previously described. The liner preferably does not extend to the edges of the plate 1, but is set back from such edges, as illustrated in Fig. 4, to allow the shell plates 1 to be readily welded together at the seams of the vessel and to prevent injury to the lining during such fabrication. The edges of the liner are welded to the shell plate by means of the spot or line welds 5'. The combined shell plate and liner are then rolled or otherwise formed to the desired shape and fabricated into the desired vessel by welding the edges of one or more shell plates together, as indicated at 16 and 17 of Fig. 4. The liner 2 may, if desired, be welded to a shell plate 1 after the shell plate has been given its desired shape but before its assembly into a finished vessel, but preferably the liner and shell plate are shaped together, as hereinabove described. After the shell plates have been welded together to form a vessel the seams in the lining are sealed by any of the methods illustrated in Figs. 2, 3 and 4.

Longitudinal seams in the shell of the vessel and the lining are made in substantially the same manner as the circumferential seams illustrated in the various views of the drawing. Where one or more circumferential and longitudinal seams meet it is understood that the alloy material 7 and 7' in Figs. 1 and 2 and the alloy plates 11 and 11' in Figs. 3 and 4 would be welded together with non-corrosive alloy metal at such point to provide a continuous alloy seal for the lining.

A thickness of 1/8 inch and a relative proportion of 1/3 alloy and 2/3 steel will generally be found satisfactory for the liner plates. I contemplate, however, employing plates of any desired thickness and having any desired ratio of alloy to steel. The relative thickness of the steel portion 3 and alloy portion 4 will depend upon the thickness of these materials when bonded together in the billet form. Since the composite liner plates employed by my invention contain a large portion of ordinary steel which is less expensive than noncorrosive alloy steel the original cost of the lining is considerably less than in the case of a lining composed entirely of alloy, particularly in view of the fact that such lining consisting entirely of alloy steel must be made substantially as thick as my composite liner to obtain the necessary mechanical strength.

My invention is capable of various modifications and should be limited solely by the scope of the appended claims.

I claim:

1. A high-pressure corrosion-resistant vessel comprising a steel outer shell, a composite integral duplex lining consisting of a layer of steel and a layer of noncorrosive alloy metal disposed within said shell with the steel surface of the lining adjacent the inner surface of the shell, means comprising steel welds connecting the adjacent steel surfaces for securing said lining in fixed relationship to said outer shell at a plurality of points over the adjacent surfaces, a slot in said lining at adjacent edges thereof, a steel strip disposed in said slot, a steel weld connecting said strip to said steel shell, a strip of noncorrosive alloy metal disposed against said steel strip and overlapping adjacent alloy surfaces of said lining at said adjacent edges thereof, and welds of noncorrosive alloy metal for joining the edges of said alloy strip to said alloy surfaces whereby a seal of noncorrosive alloy metal is provided for such adjacent edges of the lining.

2. A high pressure corrosion-resistant vessel comprising a steel outer shell, composite integral duplex lining sheets each consisting of a layer of steel and a layer of noncorrosive metal disposed within said shell with the steel surface of the lining adjacent the inner surface of the shell, means comprising steel welds connecting the adjacent steel surfaces for securing said lining sheets in fixed relationship to said outer shell at a plurality of points over the adjacent surfaces, said lining sheets being separated to form a slot, a steel strip disposed in said slot, a steel weld connecting said strip to said steel shell, a strip of noncorrosive metal bonded to said steel strip, said noncorrosive metal strip being of a larger size than said steel strip so that it overlaps portions of the surface of the noncorrosive metal layers of said lining sheets adjacent said slot, and welds of noncorrosive metal for joining the edges of said noncorrosive metal strip to the surface of said noncorrosive metal layers whereby a seal of noncorrosive alloy metal is provided for such adjacent edges of the lining sheets.

GEORGE W. WATTS.